United States Patent

Knobloch

(10) Patent No.: US 11,252,854 B2
(45) Date of Patent: Feb. 22, 2022

(54) REAL-TIME SEEDBED UNIFORMITY DETECTION AND IMPROVEMENT IN AN AGRICULTURAL TILLAGE IMPLEMENT

(71) Applicant: CNH Industrial America LLC, New Holland, PA (US)

(72) Inventor: Dean A. Knobloch, Tucson, AZ (US)

(73) Assignee: CNH Industrial America LLC, New Holland, PA (US)

(*) Notice: Subject to any disclaimer, the term of this patent is extended or adjusted under 35 U.S.C. 154(b) by 448 days.

(21) Appl. No.: 16/210,270

(22) Filed: Dec. 5, 2018

(65) Prior Publication Data

US 2020/0178454 A1 Jun. 11, 2020

(51) Int. Cl.
*A01B 63/00* (2006.01)
*A01B 79/00* (2006.01)

(52) U.S. Cl.
CPC .......... *A01B 63/008* (2013.01); *A01B 79/005* (2013.01)

(58) Field of Classification Search
CPC ... A01B 63/008; A01B 79/005; A01B 63/002; A01B 63/00; A01B 79/00
See application file for complete search history.

(56) References Cited

U.S. PATENT DOCUMENTS

| 8,160,784 | B2 | 4/2012 | Fukumoto |
| 9,285,501 | B2 | 3/2016 | Christy et al. |
| 9,516,798 | B2 | 12/2016 | Sudbrink et al. |
| 9,629,304 | B2 | 4/2017 | Zielke |
| 9,801,332 | B2 | 10/2017 | Landphair et al. |
| 9,872,422 | B2 | 1/2018 | Sudbrink et al. |
| 9,943,027 | B2 | 4/2018 | Sauder et al. |

(Continued)

FOREIGN PATENT DOCUMENTS

| CA | 2 999 077 A1 | 3/2017 |
| WO | 2017/158006 A2 | 9/2017 |
| WO | 2017/197274 A1 | 11/2017 |

OTHER PUBLICATIONS

Case IH Agriculture; AFS Soil Command Delivers Real-Time Seedbed Quality Feedback; Feb. 16, 2018; pp. 1-3; available at: http://blog.caseih.com/afs-soil-command-delivers-real-time-seedbed-quality-feedback/.

(Continued)

*Primary Examiner* — Christopher J. Novosad
(74) *Attorney, Agent, or Firm* — Rebecca L. Henkel; Rickard K. DeMille

(57) ABSTRACT

An apparatus and method for determining uniformity of a tilled surface of a seedbed prepared by a tillage tool of an agricultural tillage implement utilize a seedbed uniformity sensing arrangement including a sensing element having a sensor body adapted for vertically articulating attachment to the implement behind the tillage tool and defining a soil-contact surface configured to bear against the tilled surface. The sensing element includes a vertical position sensor including a strain gauge fixedly attached to the sensor body for generating a surface uniformity signal in response to bending loads imposed on the sensor body by vertical movement of the soil-contact surface as it rides along on the tilled surface. The surface uniformity signal is processed to provide an indication of the general uniformity of the tilled surface, and a surface control signal that is used for controlling operational parameters of the tillage implement.

21 Claims, 10 Drawing Sheets

(56) References Cited

U.S. PATENT DOCUMENTS

| | | |
|---|---|---|
| 9,968,030 B2 | 5/2018 | Kowalchuk et al. |
| 2017/0049044 A1 | 2/2017 | Stoller et al. |
| 2017/0105331 A1 | 4/2017 | Herlitzius et al. |
| 2017/0332543 A1 | 11/2017 | Magarity et al. |
| 2018/0139891 A1 | 5/2018 | Gerber et al. |
| 2018/0139892 A1 | 5/2018 | Knobloch et al. |
| 2018/0160613 A1 | 6/2018 | Kovach et al. |
| 2019/0075710 A1* | 3/2019 | Strnad .................. A01C 5/066 |

OTHER PUBLICATIONS

Crummett, Dan; Farm Challenges Spawn New Tillage Tech; Farm Equipment; Product Innovations & Introductions; Apr. 17, 2018; pp. 1-18; available at: https://www.farm-equipment.com/articles/15379-farmschallenges-spawn-new-tillage-tech.

Isavi, Salar and Mahmoudi, Asghar; Design, Fabrication and Evaluation of a Mechanical Transducer for Real Time Measurement of Tilth Aggregate Sizes; Agricultural Engineering International: The CIGR E-Journal; Jul. 2013; vol. 15, No. 2; pp. 130-137; available at: https://www.researchgate.net/publication/287586132_Design_fabrication_and_evaluation_of_a_mechanical_transducer_for_real_time_measurement_of_tilth_aggregate_sizes.

\* cited by examiner

REAL-TIME SEEDBED UNIFORMITY DETECTION AND IMPROVEMENT IN AN AGRICULTURAL TILLAGE IMPLEMENT

FIELD OF THE INVENTION

The present invention pertains to agricultural tillage implements, and, more specifically, to agricultural tillage implement structures and methods for enhancing uniformity of a tilled surface of a seedbed prepared by an agricultural tillage implement.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

Agricultural science has demonstrated that having a flat and smooth floor at the bottom of the seedbed, and a relatively even surface finish are critical to achieving proper placement of seed into the seedbed by planting equipment. Irregularities in the seedbed floor or surface can cause planter row units to bounce or otherwise move in a manner that causes seed placement at a non-optimum and undesired depth.

In selecting the desired planting depth, a number of factors are taken into account, such as the temperature, tilth and moisture of the soil, and the seed variety being planted. It is also very important to have all of the seed in a row planted at a uniform depth, so that all of the seeds germinate and emerge from the soil at substantially the same time. If the seed placement and depth are not uniform and as desired, the plants will compete with one another for moisture and nutrients, and the earlier emerging plants will stunt the growth and reduce the yield of later emerging plants.

Setting up a tillage implement so that its tillage tools generate a uniform tilled floor surface of the seedbed is particularly difficult, because the seedbed rests on and prevents directly viewing the tilled floor surface. Until now, the only viable option available for directly examining the seedbed floor during setup and operation of the implement to check the performance of the tillage tools in forming a uniform seedbed floor required digging away a section of the seedbed.

The process of digging away a section of the seedbed to inspect the seedbed floor must typically be repeated several times to get the tillage tools properly set up, undesirably taking time away from the actual tillage operation. This process of repeatedly digging away the seedbed to verify performance and proper set up of the tillage tools is onerous enough, that many operators choose to not perform this process as often or as thoroughly as is needed to optimize performance of the tillage implement.

Changes in operating speed can have a significant effect on uniformity of the tilled surfaces. There presently is no way to determine and compensate for such effects on the seedbed floor uniformity on-the-fly, in real time, during tillage operations.

It is desirable, therefore, to provide an improved apparatus and method for determining the uniformity of a seedbed floor formed by the tillage tools of an agricultural tillage implement. It is particularly desirable to provide such an improved apparatus and method in a form that allows the uniformity of a seedbed floor to be determined on-the-fly, in real-time, during tillage operations. It is also desirable to provide an apparatus and method that uses seedbed uniformity information determined on-the-fly, in real-time, during tillage operations for controlling an operating parameter of the tillage implement and/or a vehicle towing the implement on-the-fly, in real-time, during tillage operations for optimizing uniformity of the tilled surface. It is further desirable to provide an improved apparatus and method for determining and controlling the uniformity of a tilled surface formed by the tillage tools acting on the top surface of the seedbed and on tillage tools forming the floor of the seedbed.

SUMMARY OF THE INVENTION

The invention provides an apparatus and a method for determining uniformity of a tilled surface of a seedbed prepared by a tillage tool of an agricultural tillage implement. The apparatus and method utilize a seedbed uniformity sensing arrangement including a sensing element that has a sensor body adapted for vertically articulating attachment to the implement behind the tillage tool and defining a soil-contact surface configured to bear against the tilled surface. The sensing element includes a vertical position sensor fixedly attached to the sensor body for generating a surface uniformity signal in response to vertical movement of the soil-contact surface as it rides along on the tilled surface. The surface uniformity signal is processed to provide an indication of the uniformity of the tilled surface. The surface uniformity signal may also be used for generating a surface control signal that is used for controlling operational parameters of the tillage implement.

In one form of the invention an apparatus is provided for real-time determination of uniformity of a tilled surface of a seedbed, on-the-fly, as the tilled surface is formed by a tillage tool of an agricultural tillage implement travelling in a tillage direction over a ground surface with the tillage tool operatively engaging the ground surface. The apparatus includes a seedbed uniformity sensing arrangement including a sensing element and a signal processing unit.

The sensing element has a sensor body adapted for vertically articulating attachment to the implement behind the tillage tool and defining a soil-contact surface configured to bear downward against the tilled surface. The sensing element also includes a vertical position sensor fixedly attached to the sensor body for generating an electrical surface uniformity signal in response to vertical movement of the soil-contact surface as it rides along on the tilled surface behind the tillage tool as the tilled surface is formed by the tillage tool of the agricultural tillage implement as the implement travels in the tillage direction over the ground surface with the tillage tool operatively engaging the ground surface.

The signal processing unit is operatively connected in electrical communication with the vertical position sensing element for receiving the surface uniformity signal, and it is configured for determining surface uniformity from the surface uniformity signal and providing a surface information signal that is indicative of the uniformity of the tilled surface of the seedbed. In some forms of the invention, the signal processing element may be mounted in the sensor body.

In some forms of the invention, the vertical position sensor is a strain gauge that is fixedly attached to the sensor body for generating the electrical surface uniformity signal in response to bending loads imposed on the sensor body by vertical movement of the soil-contact surface as it rides along on the tilled surface. The signal processing unit is operatively connected in electrical communication with the strain gauge of the sensing element for receiving the surface uniformity signal and is configured for determining surface uniformity from the surface uniformity signal and providing a surface information signal that is indicative of the uniformity of the tilled surface of the seedbed.

The sensor body may define substantially perpendicularly extending longitudinal and vertical axes of the sensor body, front and rear ends of the sensor body, a vertically flexible section of the body disposed between the front and rear ends of the sensor body, and forward of the soil-contact surface of the sensor body. The front end of the sensor body may further define a mounting arrangement adapted for operative attachment to the implement in a manner that positions the sensor body behind the tillage tool in operative contact with the tilled surface behind the tillage tool.

The strain gauge may be operatively and fixedly attached to the flexible section of the body and configured for detecting a bending load on the flexible section imposed by vertically directed force generated by contact between the soil-contacting surface of the sensor body and the tilled surface behind the tillage tool. The strain gauge may be further configured for generating an electrical present strain signal that is indicative of the present bending load being imposed on the flexible section of the sensor body by present contact between the tilled surface and the soil-contacting surface of the sensor body. In some forms of the invention, the signal processing unit may be operatively connected for receiving the present strain signal from the strain gauge and configured for converting the present strain signal into the tilled surface uniformity signal.

In some forms of the invention, where the implement includes a controller that is configured and operatively connected for controlling an operational parameter of the implement, the signal processing unit may be configured for providing an operating parameter control signal for controlling at least one operating parameter of the tillage implement in a manner that improves uniformity of the tilled surface. Such operating parameters may include vertical positioning and downforce applied to the tillage tool, or operating speed of the towing vehicle during tillage operations.

In forms of the invention where the implement includes multiple tillage tools operatively disposed with relation to one another for producing a seedbed swath having a substantially continuous tilled surface, and the seedbed uniformity sensing arrangement may include multiple sensing elements arranged in sensing array for contacting the substantially continuous tilled surface at various points within the seedbed swath. A single, common signal processing unit may be operatively connected to the multiple sensing elements for receiving their respective surface uniformity signals, and it may be configured for determining a composite surface uniformity across the seedbed swath from the surface uniformity signals of the multiple sensing elements and providing a surface information signal that is indicative of the composite surface uniformity across the continuous tilled surface of the seedbed swath.

The invention may be practiced in applications where the tillage tool creates a tilled surface in the form of a seedbed floor. In some forms of such applications, the tillage implement may include a flexible shank having a distal end adapted for receiving a sub-surface tillage tool that is attached to the distal end of a flexible shank of the tillage implement and defines a bottom surface of the sub-surface tool. The sensor body of the sensing element may be attached to the shank behind the sub-surface tool with the soil-contacting surface of the sensor body disposed along a reference plane that is vertically aligned with the bottom surface of the sub-surface tool. In some forms of the invention the soil-contacting surface of the sensor body may be vertically aligned with the bottom of the sub-surface tool.

The invention may be practiced in applications where the tillage tool creates a tilled surface in the form of a top surface of the seedbed. The tillage tool in such an application of the invention may be a surface finishing tool operatively disposed at a rear end of tillage implement and defining a bottom surface of the surface finishing tool. The sensor body of the sensing element may be attached to the surface finishing tool behind the surface finishing tool with the soil-contacting surface of the sensor body disposed along a reference plane that is vertically aligned with the bottom surface of the surface finishing tool. In some forms of the invention the soil-contacting surface of the sensor body may be vertically aligned with the bottom of the surface finishing tool.

The invention may also take the form of an agricultural tillage implement that includes one or more real-time tilled surface uniformity determining apparatuses in accordance with the invention.

Such an agricultural tillage implement according to the invention may have an implement frame supported above a ground surface by implement support wheels operatively connected to the frame by a depth control arrangement. The frame defines a longitudinal axis of the implement extending from a front end to a rear end of the implement. The implement is configured for operation in a forward direction along a line of travel extending substantially parallel to the fore-aft longitudinal axis. A soil engaging tillage tool is attached to a frame of the implement and configured for creating a tilled surface behind the tillage tool as the implement moves in the forward direction along the line of travel. The implement includes a real-time tilled surface uniformity determining apparatus, according to the invention, for real-time determination of uniformity of the tilled surface of a seedbed as the tilled surface is formed by the tillage tool as the implement travels in the forward direction over the ground surface with the tillage tool operatively engaging the ground surface.

The invention may also take the form of a method for determining in real-time the uniformity of a tilled surface of a seedbed as the tilled surface is formed by a tillage tool of an agricultural tillage implement travelling in a tillage direction over a ground surface with the tillage tool operatively engaging the ground surface.

One form of such a method, according to the invention, may include: providing a sensing element having a sensor body adapted for vertically articulating attachment and defining a soil-contact surface configured to bear downward against the tilled surface and including a vertical position sensor fixedly attached to the sensor body for generating an electrical surface uniformity signal in response to vertical movement of the soil-contact surface as it rides along on the tilled surface behind the tillage tool as the tilled surface is formed by the tillage tool; attaching the sensing element to the implement behind the tillage tool; operating the implement in the tillage direction over the ground surface with the tillage tool operatively engaging the ground surface and the vertical position sensor generating the surface uniformity signal; and, determining surface uniformity from the surface uniformity signal and providing a surface information signal that is indicative of the uniformity of the tilled surface of the seedbed.

Some forms of a method according to the invention may also include generating an operating parameter control signal from the surface information signal for controlling at least one operating parameter of the tillage implement in a manner that improves uniformity of the tilled surface.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
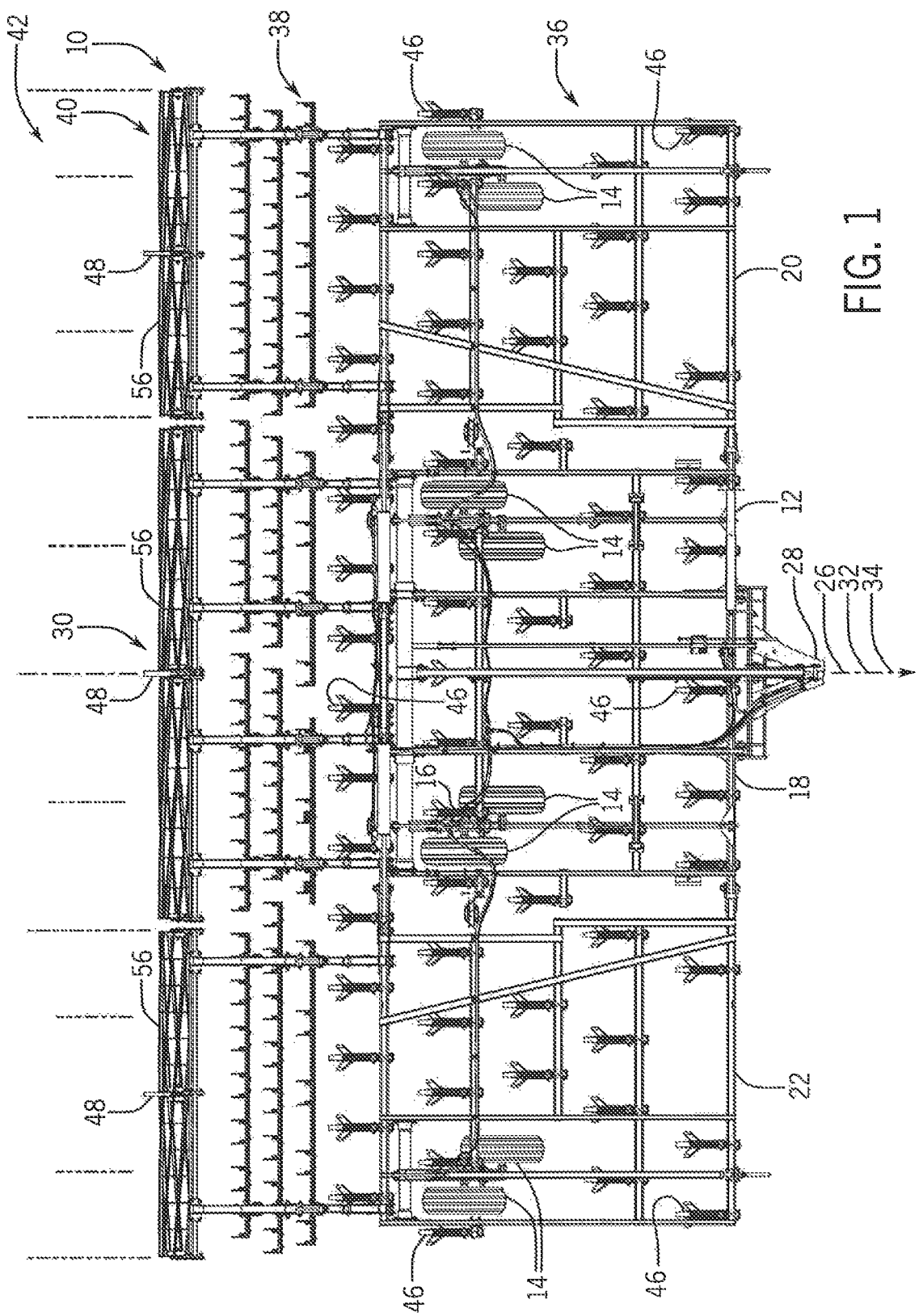
FIG. 1 illustrates a plan view of an agricultural implement, in accordance with an exemplary embodiment of the present invention.

FIG. 1 shows an exemplary embodiment of an agricultural tillage implement 10, in the form of a multi-tool field cultivator that incorporates several real-time, tilled surface uniformity determining apparatuses in accordance with the invention, as described in greater detail below.

The exemplary embodiment of the agricultural tillage implement 10 includes an implement frame 12 supported above a ground surface by implement support wheels 14 that are operatively connected to the frame 12 by a depth control arrangement 16. The frame 12 of the exemplary embodiment of the implement 10 is made up of a center frame section 18, along with left and right folding frame sections 20, 22 that are connected to the center frame section 18 by hinged joints in a manner that allows the left and right frame sections 20, 22 to be folded upward above the center section 18 of the frame 12 to narrow the implement 10 for transport on public roadways.

The frame 12 defines a longitudinal axis 26 of the implement extending from a front end 28 to a rear end 30 of the implement 10. The implement 10 is configured for operation in a forwardly-directed tillage direction 32 along a line of travel 34 extending substantially parallel to the fore-aft longitudinal axis 26 of the implement 10.

The exemplary embodiment of the implement 10 is a multifunctional implement that combines three different types of tillage tools into a single operating unit. Specifically, the implement 10 includes a field cultivator 36, followed by a spring-tine harrow 38, that is in turn followed by a surface finisher in the form of a reel-type crumbler 40. Arrays of tillage tools in the field cultivator 36, the spring-tine harrow 38 and the crumbler 40 work together as the implement is towed in the tillage direction 32 across the ground surface to create a seedbed swath 42 that extends beneath and behind the tillage tools as the implement 10 moves in the tillage direction 32 along the line of travel 34

Figure 2:
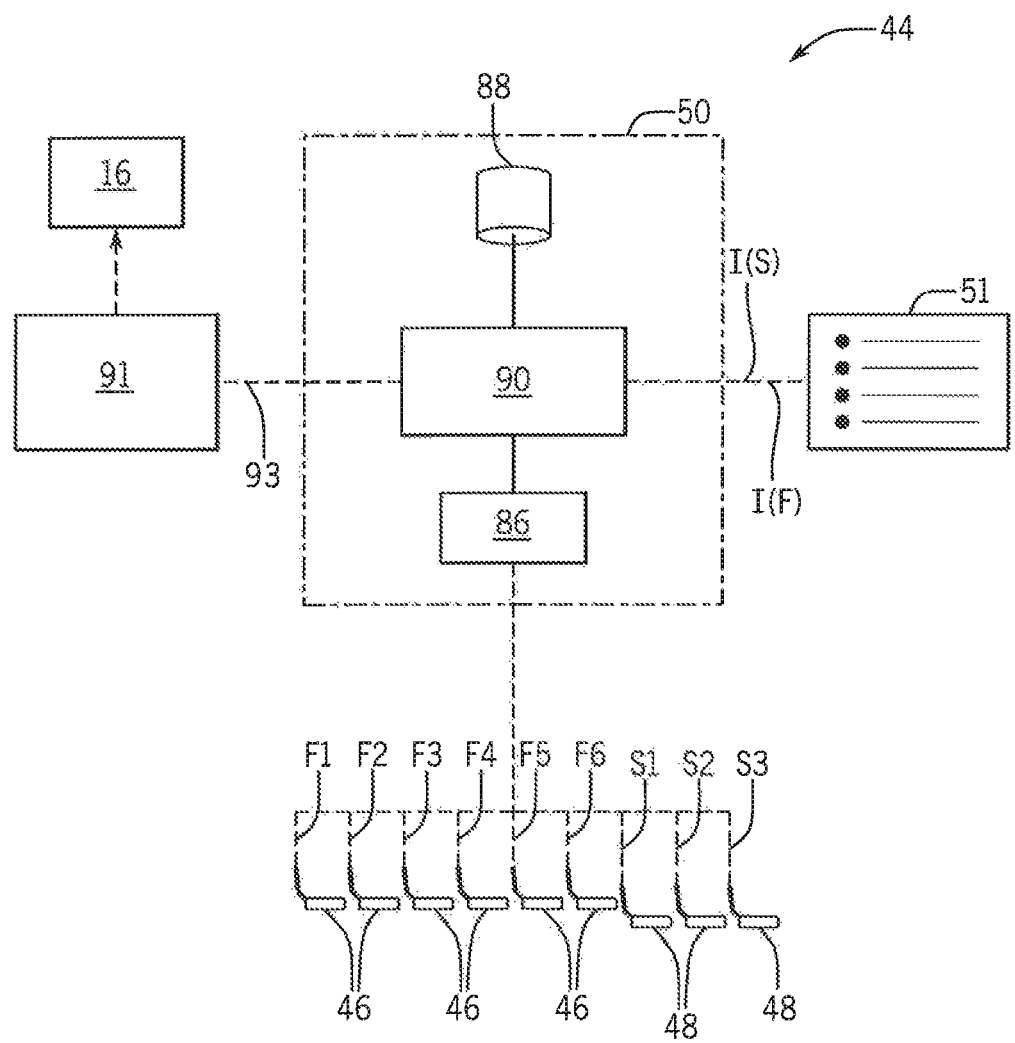
FIG. 2 illustrates a schematic illustration of a real-time tilled surface uniformity determination apparatus of the implement of FIG. 1, in accordance with an exemplary embodiment of the present invention.

As shown in FIG. 2, the implement 10 includes an exemplary embodiment of a seedbed uniformity sensing arrangement, shown as real-time tilled surface uniformity determining apparatus 44, according to the invention, for real-time determination of uniformity of the tilled surface of a seedbed as the tilled surface is being formed by the tillage tools of field cultivator 36, the spring-tine harrow 38 and the crumbler 40.

Specifically, the exemplary embodiment of a real-time tilled surface uniformity determining apparatus 44 includes six seedbed floor sensors or sensing elements 46, three seedbed surface sensors or sensing elements 48, and a common signal processing unit 50 that is operatively connected in electrical communication with the six seedbed floor sensing elements 46, and the three seedbed surface sensing elements 48. Each of the six seedbed floor sensing elements 46 generates a respective electrical seedbed floor uniformity signal F1-F6, and each of the three seedbed surface sensing elements 48 generates a respective electrical seedbed surface uniformity signal S1-S3 that are communicated to the signal processing unit 50.

The signal processing unit is configured for receiving the seedbed floor and surface uniformity signals F1-F6, S1-S6, determining uniformity of the seedbed floor and top surfaces 41, 43, and for generating respective seedbed floor and surface information signals I(F), I(S) that are indicative of the uniformity of the seedbed floor and top surface 41, 43. The seedbed floor and top surface information signals I(F), I(S) may be provided in a format providing real-time quality feedback to an operator of the implement 10 on a display monitor or touchscreen 51. In some embodiments of the invention, the seedbed floor and surface information signals I(F), I(S) may be provided in a format that is readable on an IOBUS-VT compatible display.

In other embodiments of the invention, each of the sensing elements 46, 48 may connect to a separate dedicated signal processing unit 50, which prepares a separate floor or surface information signal I(F), I(S).

Figure 3:
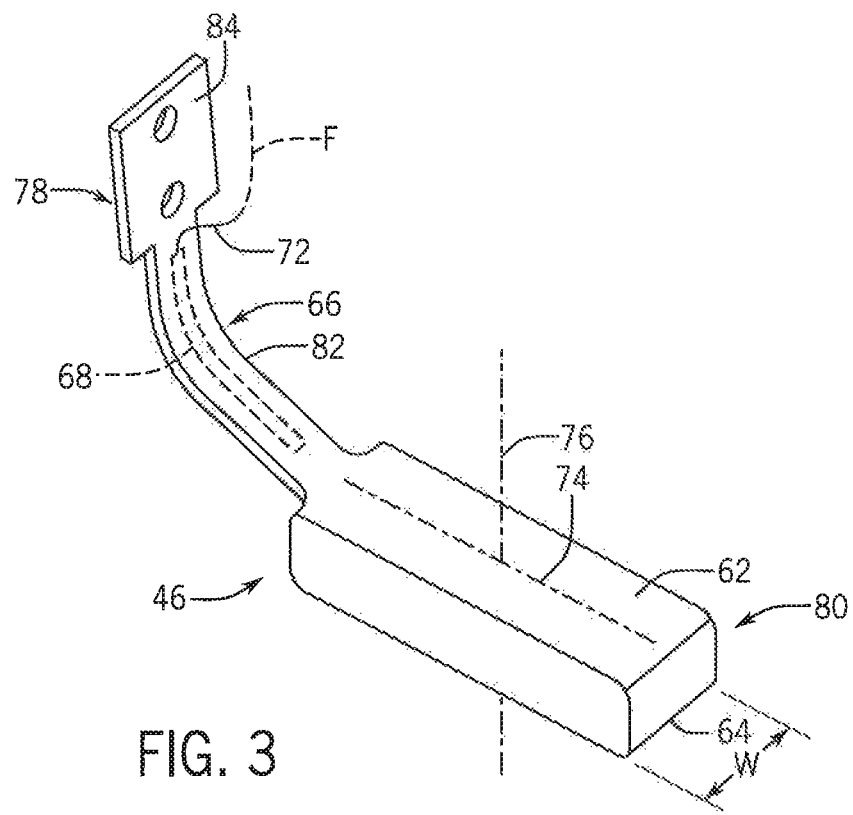
FIGS. 3 and 4 illustrate isometric views of a seedbed floor sensing element and a seedbed surface sensing element, respectively, of the real-time tilled surface uniformity determination apparatus of FIG. 2, in accordance with an exemplary embodiment of the present invention.
Figure 5:
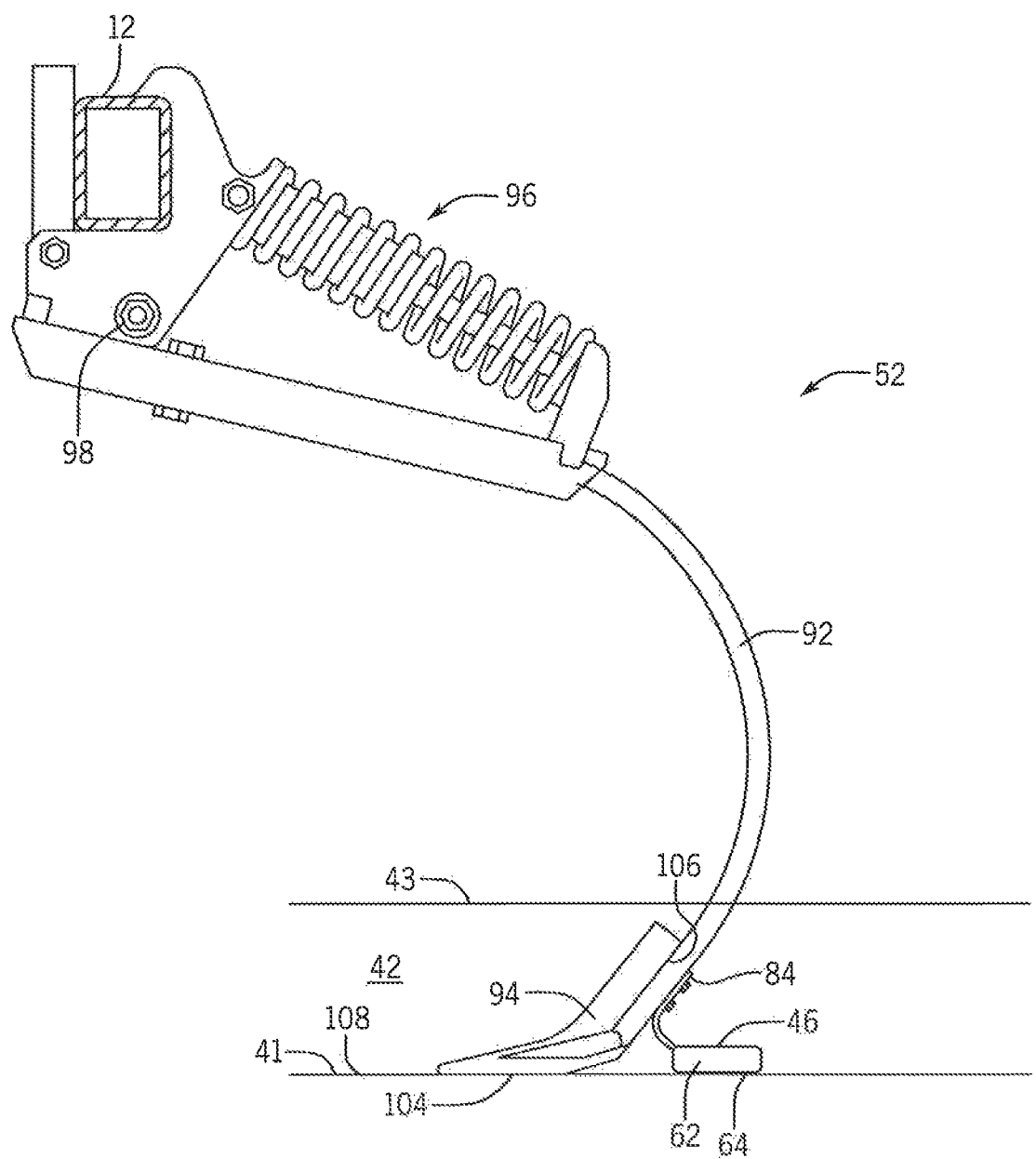
FIG. 5 illustrates an elevation view showing attachment of the seedbed floor sensing element of FIG. 3 to a subsurface tool arrangement of the tillage implement of FIG. 1, in accordance with an exemplary embodiment of the present invention.

The six seedbed floor sensors 46 used in the exemplary embodiment of the implement 10 are configured in the manner shown in FIG. 3 and are individually attached to one of the multiple sub-surface tillage tool arrangements 52 of the field cultivator 36 of the implement 10 in the manner shown in FIG. 5.

Figure 4:
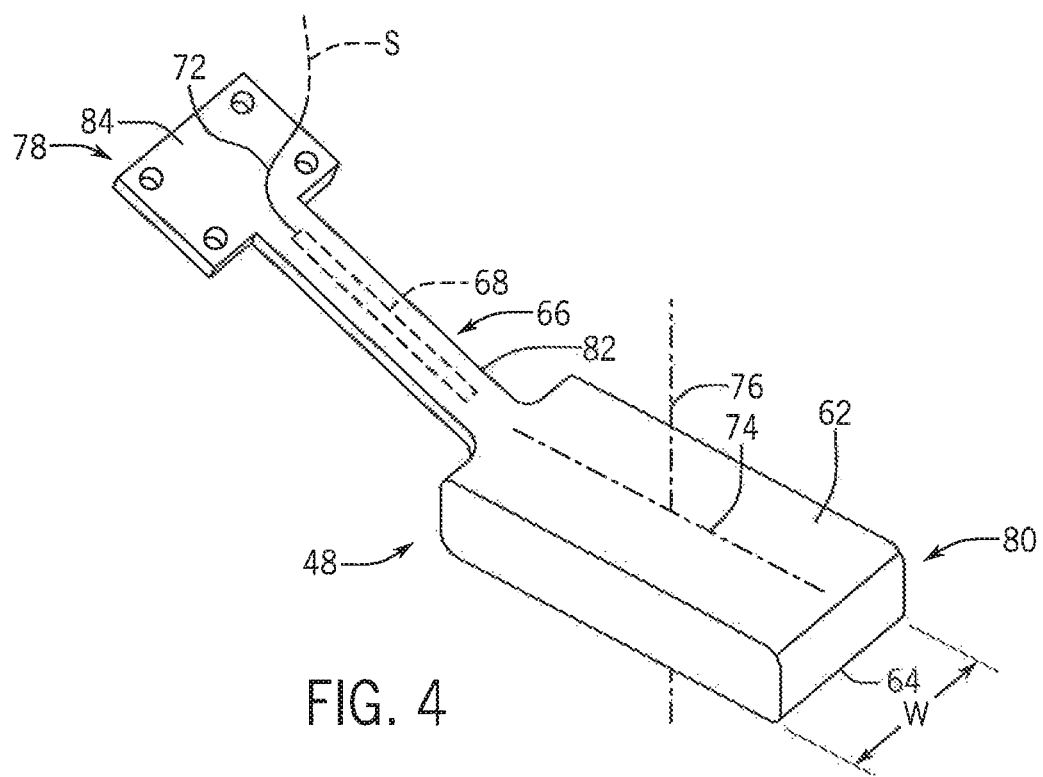
Figure 6:
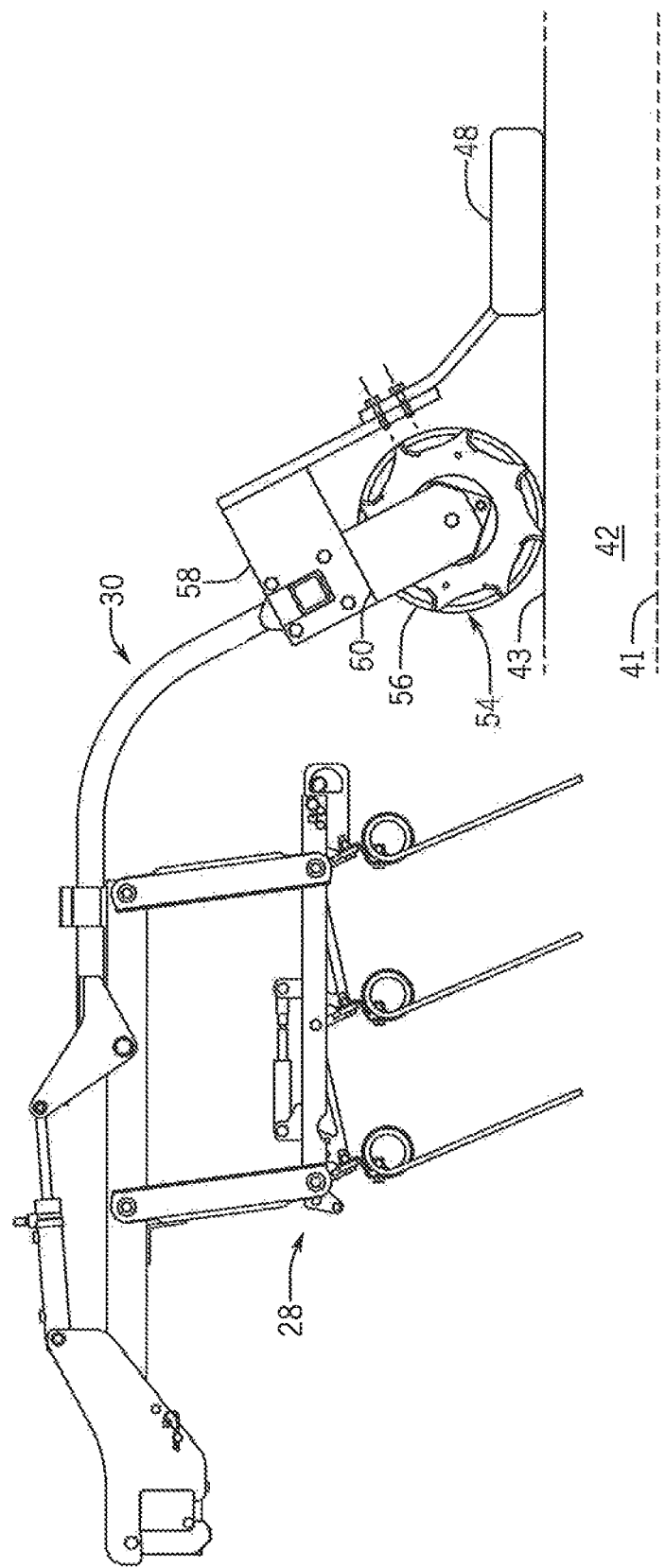
FIG. 6 illustrates an elevation view showing attachment of the seedbed surface sensing element of FIG. 4 to a surface finishing tool arrangement of the tillage implement of FIG. 1, in accordance with an exemplary embodiment of the present invention.

In similar fashion, the three seedbed surface sensing elements 48 used in the exemplary embodiment of the implement 10 are configured in the manner shown in FIG. 4 and are individually attached to one of the crumbler tillage tool arrangements 54 of the crumbler 30 of the implement 10 in the manner shown in FIG. 6.

As shown in FIGS. 1, 5 and 6, in forms of the invention where an implement 10, such as the multi-function field cultivator 10 of the exemplary embodiment, includes multiple tillage tool arrangements 52, 38, 54 that are operatively disposed with relation to one another for producing a seedbed swath 42 having a substantially continuous tilled floor surface 41 and a substantially continuous tilled top surface 43, the seedbed uniformity sensing arrangement such as real-time tilled surface uniformity determining apparatus 44 may include multiple seedbed floor and surface sensing elements 46, 48 arranged in respective sensing element arrays for contacting the substantially continuous tilled floor and top surfaces 41, 43 at various points within the seedbed swath 42.

While it is contemplated within the scope of the invention that some embodiments might include a seedbed floor or surface sensing element behind each tillage tool of an implement for sensing uniformity of the entirety of the continuous floor and top tillage surfaces 42, 43, in the exemplary embodiment of the implement 10 only six of the sub-surface tillage tool arrangements 52 include seedbed floor sensing elements 46, and only three seedbed surface sensing elements 48 are utilized.

As shown in FIGS. 1 and 6, the crumbler 30 includes three crumbler reel arrangements 56 that are operatively attached respectively to the center, left and right sections 18, 20, 22 of the frame 12, and disposed in an end-to-end manner to span the entire width of the seedbed swath 42. The three seedbed surface sensing elements 48 are attached to the crumbler 30 by brackets 58 extending from crumbler reel mounting brackets 60 located at approximately a center point of each of the crumbler reel arrangements 56.

As shown in FIGS. 1 and 5, the six seedbed floor sensors 46 of the exemplary embodiment of the implement 10 are attached to six of the sub-surface tillage arrangements 52 of the field cultivator 36 in a spaced-apart fashion to form an array of the seedbed floor sensors 46 that extends substantially across the width of the tillage swath 42, and substantially along the entire longitudinal length of the field cultivator 36, as indicated by reference numerals 46 in FIG. 1.

As shown in FIG. 1, the six seedbed floor sensing elements are arranged in an array having two sensors 46 in each of the center, left and right sections 18, 20, 22 of the frame 12 of the implement 10. In each of the center, left and right frame sections 18, 20, 22, one of the sensors 46 is attached to a sub-surface tillage tool arrangement 52 located near the front end of the field cultivator 36, and the other sensor 46 is attached to a sub-surface tillage tool arrangement 52 located near the rear of the field cultivator 36.

Having the sensors 46 located in this manner, along the front and rear ends of the implement frame sections 18, 20, 22 allows the sensing elements 46 in the field cultivator 36 set up in this manner allows the real-time tilled surface uniformity determination apparatus 44 to also be advantageously used for setting up and adjusting the fore-aft trim of the frame 12. For example, during initial set up, the implement 10 can be parked on a flat surface, and signals from the seedbed floor sensors 46 at the front and rear of each frame section 18, 20, 22 can be used during adjustment of the fore-aft level, or trim, of the frame 12. The sensors 46 can also be used when the implement 10 is operating in the field for aiding subsequent adjustments to the fore-aft trim, either while the implement is standing still or on-the-fly, with the implement's tillage tools fully engaging the ground surface.

As shown in FIGS. 3 and 4, the seedbed floor and surface sensing elements 46, 48 are similar in construction and functionality. Accordingly, identical reference numerals will be used wherever practical in FIGS. 3 and 4 for describing similar features and aspects of the sensing elements 46, 48.

Each sensing element 46, 48 has a sensor body 62 that is adapted for vertically articulating attachment to the implement 10 behind the one of the tillage tool arrangements 52, 54, and it defines a soil-contact surface 64 that is configured to bear downward against a respective floor or top tilled surface 41, 43 of the seedbed 42.

Each sensing element 46, 48 also includes a vertical position sensor arrangement or vertical position sensor 66, including a strain gauge 68 that is fixedly attached to the sensor body 62 for generating an electrical surface uniformity signal (F for sensor 46; S for sensor 48) that is delivered through a lead 72 in response to vertical movement of the soil-contact surface 64 of the sensing element 46, 48 as it rides along on the tilled surface (41 or 43) behind its associated tillage tool, as the tilled surface (41 or 43) is being formed by the associated tillage tool as the implement 10 travels in the tillage direction 32 over the ground surface with the tillage tool operatively engaging the ground surface.

The sensor bodies 62 define substantially perpendicularly extending longitudinal and vertical axes 74, 76 of the sensor body 62, front and rear ends of 78, 80 the sensor body 62, and a vertically flexible section 82 of the sensor body 62 disposed between the front and rear ends 78, 80 of the sensor body 62 and extending forward of the soil-contact surface 64 of the sensor body 62. The front end 78 of the sensor body 62 is configured to define a mounting arrangement 84 of the sensor body 62 that is adapted for operative attachment of the sensor body 62 to the implement 10 in a manner that positions the sensor body 62 behind its associated tillage tool in operative contact with the respective tilled surface (41 or 43) behind the tillage tool.

The strain gauge 68 is operatively and fixedly attached to the flexible section 82 of the sensor body 62 and is configured for detecting a bending load on the flexible section 82 imposed by vertically directed forces that are generated by contact between the soil-contacting surface 64 of the sensor body 62 and the tilled surface (41 or 43) behind the tillage tool. The strain gauge 68 is further configured for generating an electrical present strain signal, that constitutes the present tilled surface uniformity signal (F or S), and it is indicative of the present bending load being imposed on the flexible section 82 of the sensor body 62 by the present contact between the tilled surface (42 or 43) and the soil-contacting surface 64 of the sensor body 62.

The present tilled surface uniformity signal F from the strain gauge 68 of the floor sensing element 46 is supplied as an output signal over an electrical lead 72 to the signal processing unit 50, where it is converted into the floor surface information signal I(F). In similar fashion, the present tilled surface uniformity signal S from the strain gauge 68 of the surface sensing element 48 is supplied as an output signal over an electrical lead 72 to the signal processing unit 50, where it is converted into the surface information signal I(S).

The sensor bodies 62 of the exemplary embodiment include surfaces that are made from a material such as stainless steel or polyethylene, or another non-stick material, so that they are resistant to picking up dirt, soil or mud. As illustrated comparatively in FIGS. 3 and 4, it is contemplated that the sensor body 62 of the seedbed floor sensing element 46 of the exemplary embodiment would have a transverse width W equal to approximately one-half of an inch, whereas the sensor body 62 of the seedbed surface sensing element would have a width W of approximately two inches or less, for example, about one inch.

The sensor body 62 of the seedbed floor sensing element 46 of the exemplary embodiment is configured such that it will exert approximately five to ten pounds of down pressure against the seedbed floor 41 when installed in the manner shown in FIG. 5. The sensor body 62 of the seedbed surface sensing element 48 of the exemplary embodiment is configured such that it will exert approximately less than five pounds of down pressure against the seedbed surface 43 when installed in the manner shown in FIG. 6.

As shown in FIG. 2, the single, common signal processing unit 50 of the exemplary embodiment includes an I/O interface 86, a data storage device 88, and a processor 90 that is operatively connected to the I/O interface 86 and the data storage device 88. The I/O interface 86 is operatively connected to the nine sensing elements 46, 48 for receiving their respective present surface uniformity signals F1-F6, S1-S6. The processor 90 of the signal processing unit 50 is configured for converting the respective present surface uniformity signals F1-F6, S1-S6 into corresponding tilled surface uniformity signals I(F), I(S), which are then transmitted for display on the touchscreen 51.

The signal processing unit 50 and the touchscreen 51 may be configured to display the real-time tillage surface uniformity information gleaned from the respective present surface uniformity signals F1-F6, S1-S6, by the processor 90, in a variety of forms.

Figure 7:
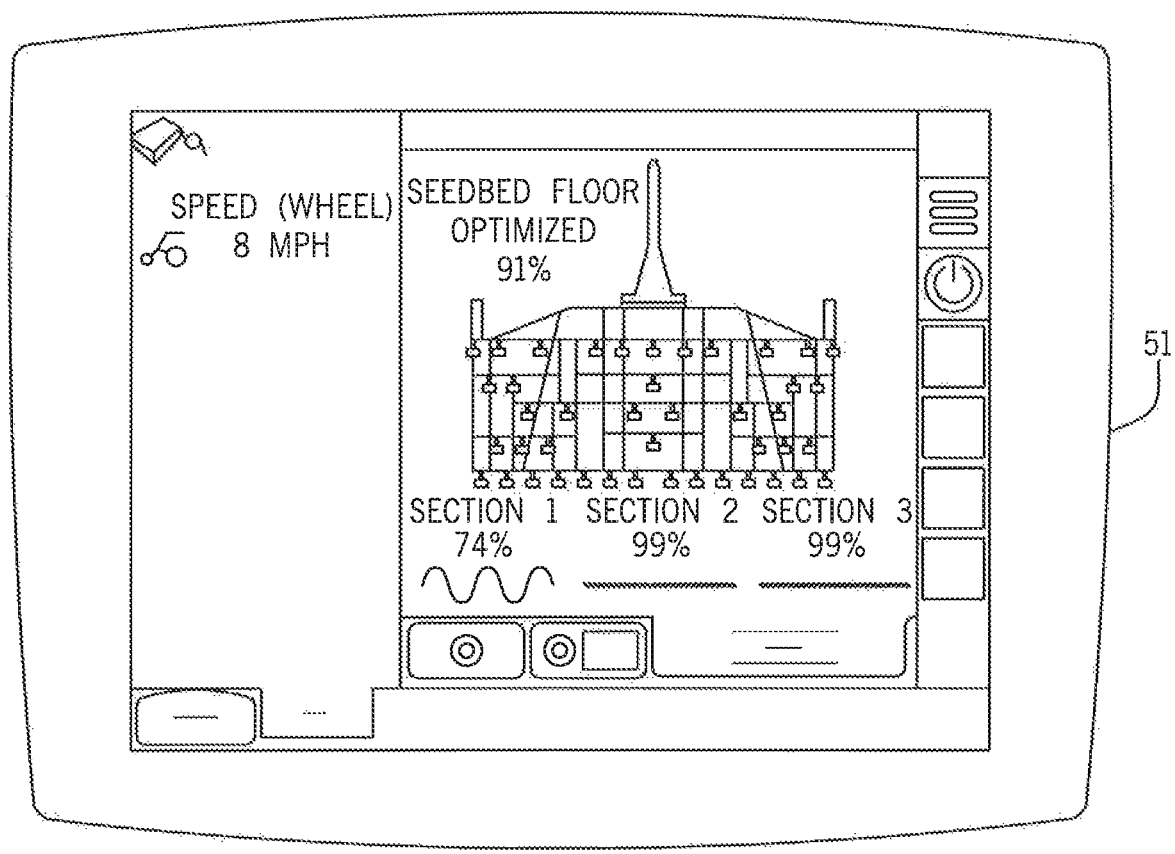
FIGS. 7 and 8 illustrate touchscreen displays of information determined by the real-time tilled surface uniformity determination apparatus of FIG. 2, in accordance with an exemplary embodiment of the present invention.

As shown in FIG. 7, for example, the touchscreen 51 is displaying a depiction of the field cultivator 36, and associated infographics, that show the present degree of smoothness of the seedbed floor 41 that is being produced respectively under each of the left, middle, and right sections 18, 20, 22 of the field cultivator 36 in real time.

In the screenshot shown in FIG. 7, the processor 90 has determined that the left section is producing a seedbed floor surface 41 that is only 74% as flat as a perfectly flat floor surface. This reading indicates that the left wing 20 of the field cultivator 36 is adjusted to run too deep for operation at the present ground speed, and it is causing the subsurface tillage tool arrangements 52 in that section of the field cultivator 36 to trip or float out, as described below, in a manner that causes the tips of the tillage tools to form a rough, grooved floor surface 41. Similarly, signals from the seedbed surface sensing elements or seedbed surface sensors 48 can indicate roughness characteristics other than rough, grooved, floor surfaces 41. One example is that an amount of vertical movement and its rapidness can indicate roughness caused by, for example, the presence of abundant large soil clods on the seedbed surface. This can be done by setting the down-pressure of the seedbed surface sensors 48 low enough, such as less than about five pounds, so that the seedbed surface sensors 48 do not crush the soil clods but, instead, are vertically deflected by them while traveling over them. In this way, when the seedbed surface sensor(s) 48 occasionally encounters a large clod, for example, large clods spaced about twenty feet or further from each other on the seedbed surface 41, the seedbed surface sensor(s) 48 will produce occasional discrete signal deviations that correspond to the occasional vertical deflections, which may be consistent with an acceptable seedbed surface condition. However, when there are a substantial number of large and hard soil clods on the seedbed surface 41, for example, large clods spaced about one foot or nearer to each other, then the seedbed surface sensor(s) 48 will largely and rapidly bounce or vertically deflect over the abundant large clods. In this situation, the seedbed surface sensor(s) 48 may produce a unique signal signature of high amplitude and frequency showing the rapid and large changes in vertical movement, indicating a clod-littered seedbed surface 41, which may be an unacceptable seedbed surface condition and may trigger an alert indicating the same that is displayed for the user through the display monitor or touchscreen 51 an which may invite an adjustment of the depth control arrangement 16 or other components of the implement 10.

The screenshot shown in FIG. 7, also indicates that the processor 90 has further determined that the center and right sections are both presently producing a seedbed floor surface 41 that is 99% as flat as a perfectly flat seedbed floor surface. This reading indicates that the center and right wings 18, 22 of the field cultivator 36 are adjusted to run properly at the present tillage depth and ground speed.

The screenshot in FIG. 7 further includes an infographic showing that, at the present time, the cumulative flatness of the floor surface 41 that is presently being produced by all three sections 18, 20, 22 of the field cultivator is 91% as flat as a perfectly flat seedbed floor surface 41. In practicing the invention, it is contemplated that a tillage surface flatness in the range of 100% to 95% might be considered a smooth surface, whereas a tillage surface flatness in the range of 95% to 92%, might be considered a moderately smooth surface, and a tillage surface flatness in the range of 92% to 0%, might be considered a rough surface.

From the information displayed on the touchscreen 51, an operator of the implement 10 can make a decision regarding whether or not to adjust an operating parameter of the implement 10 or the towing vehicle to optimize performance of the field cultivator 36. For example, if this condition is detected during initial set-up or preparation to work a field, the operator may elect to stop and make an adjustment to the operating depth of the tillage tools in the left wing 20 of the field cultivator 36. Alternatively, for example, if the left wing 20 is temporarily operating in a portion of the field having especially dense or compacted soil, the operator may elect to reduce ground speed slightly, while monitoring operation of the left wing 20 on the touchscreen 51, to find a ground speed at which the left wing 20 produces an acceptably flat floor surface 41.

Figure 8:
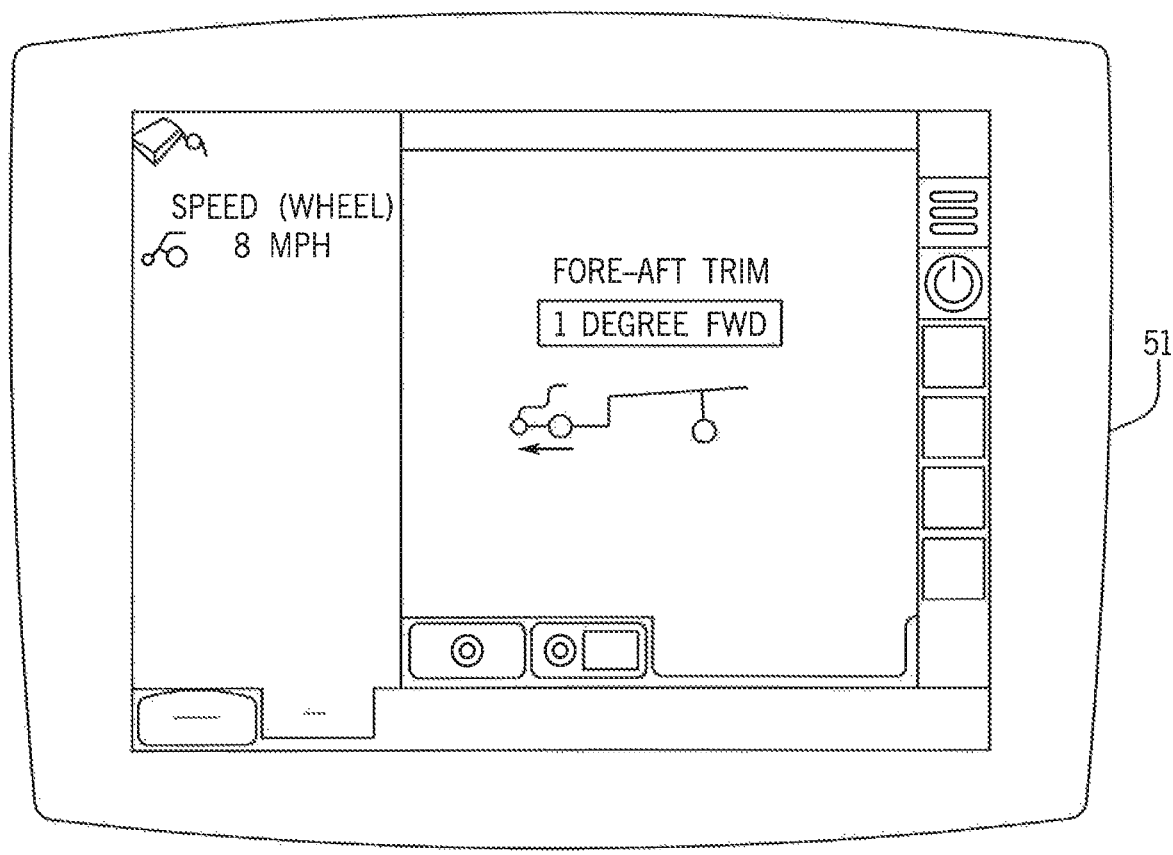

FIG. 8 shows another screenshot of the touchscreen 51 in a mode displaying the present fore-aft-trim of the frame 12 of the field cultivator 36 in real-time. The display icons show the frame 12 as being presently tilted forward-end-down by one degree. The processor 90 determines the fore-aft tilt of the frame 12 by comparing the readings from the three seedbed floor sensing elements 46 located near the front end of the frame 12 with the readings from the three seedbed floor sensing elements at the rear of the frame 12.

Similar types of displays are provided in the exemplary embodiment for real-time monitoring and optimization of the seedbed top surface 43 in real time as it is prepared by the crumbler 40.

Returning to FIG. 2, the exemplary embodiment of the seedbed uniformity sensing arrangement, shown as real-time tilled surface uniformity determining apparatus 44, includes an implement controller 91 that is configured and operatively connected to the implement 10 and/or the towing vehicle for controlling an operational parameter of the implement 10 and/or the towing vehicle. Such an operating parameter might include the operating speed of the towing vehicle, or a tillage depth adjustment as effected by the remotely controllable depth arrangement 16, or a positioning and/or down-pressure value for the crumbler 40. Such operating parameters might also include a fore-aft-trim adjustment angle in an embodiment of the implement that includes a remotely controllable fore-aft-trim adjustment arrangement.

In embodiments of the invention including an implement controller 91, the signal processing unit 50 may be configured for providing an operating parameter control signal 93 to the implement controller 91 for controlling the at least one operating parameter of the tillage implement 10 in a manner that improves uniformity of the tilled surface (41 or 43). In various embodiments of the invention, the operating parameter control signal may be manually applied by the operator, and/or automatically applied in response to the surface uniformity as determined by the signal processing unit 50 from the seedbed sensing elements 46, 48, according to instructions and data stored in the data storage device 70 of the signal processing unit 50.

As shown in FIG. 5, the sub-surface tillage tool arrangements 52 of the field cultivator 36 in the exemplary embodiment of the implement 10 include a flexible shank 92 having a distal end that is adapted for receiving a tillage tool in the form of cultivator sweep 94. The upper end of the shank 92 is pivotably attached to the frame 12 by a spring-loaded connecting arrangement 96 that allows the shank 92 to pivot about a pivot bolt 98 if the soil pressure acting against the sweep and shank 94, 92 become great enough to overcome the bias force of the spring of the spring-loaded connecting arrangement 96.

The sweep has a bottom surface 104, and a rear surface 106 when attached to the shank 92. The sensor body 62 of the seedbed floor sensing element 46 is attached by its mounting arrangement 84 to the shank 92 behind the sweep 94, with the soil-contacting surface 64 of the sensor body disposed along a reference plane 108 that is vertically spaced from the bottom surface 104 of the sweep 94. As depicted in FIG. 5 the vertical spacing between the bottom surface 104 of the sweep 94 and the reference plane 108 is set to zero, for ease of explanation and illustration. In other embodiments it is contemplated that the reference plane 108 might be vertically spaced from the bottom of the sweep 94 by a short distance to facilitate operation of the floor sensing element 46.

Figure 11:
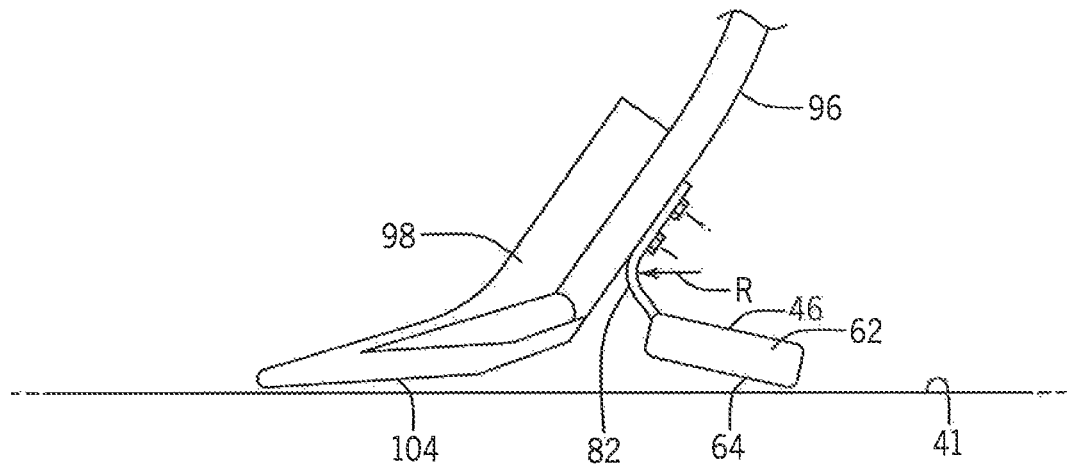
FIGS. 11 and 12 illustrate real-time operation of the sensing arrangement calibrated per FIGS. 9 and 10, in accordance with an exemplary embodiment of the present invention.
Figure 12:
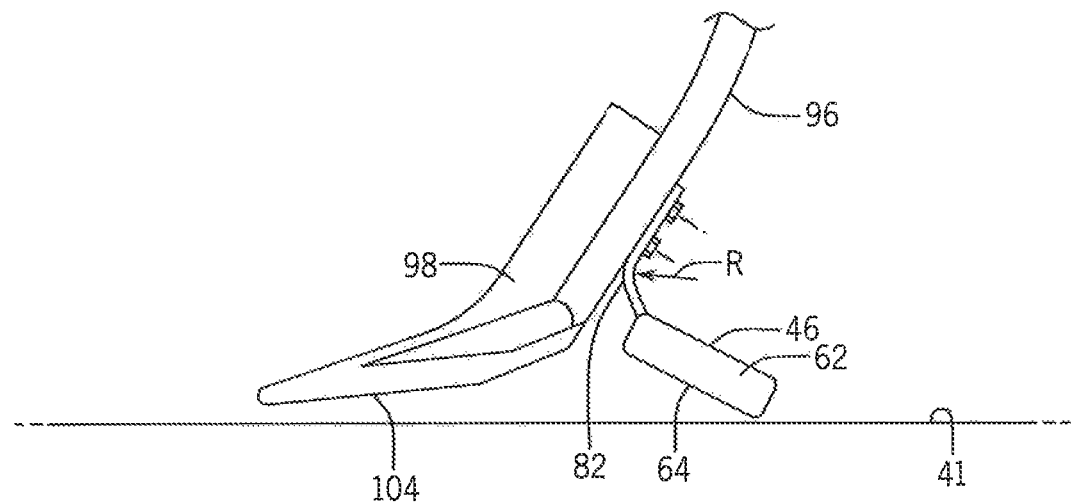

Calibration and operation of the exemplary embodiment of the real-time tilled surface uniformity determining apparatus 44 will be explained with reference to FIGS. 9-12. More specifically, FIGS. 9 and 10 illustrate the calibration process, and FIGS. 11 and 12 illustrate operation.

Figure 9:
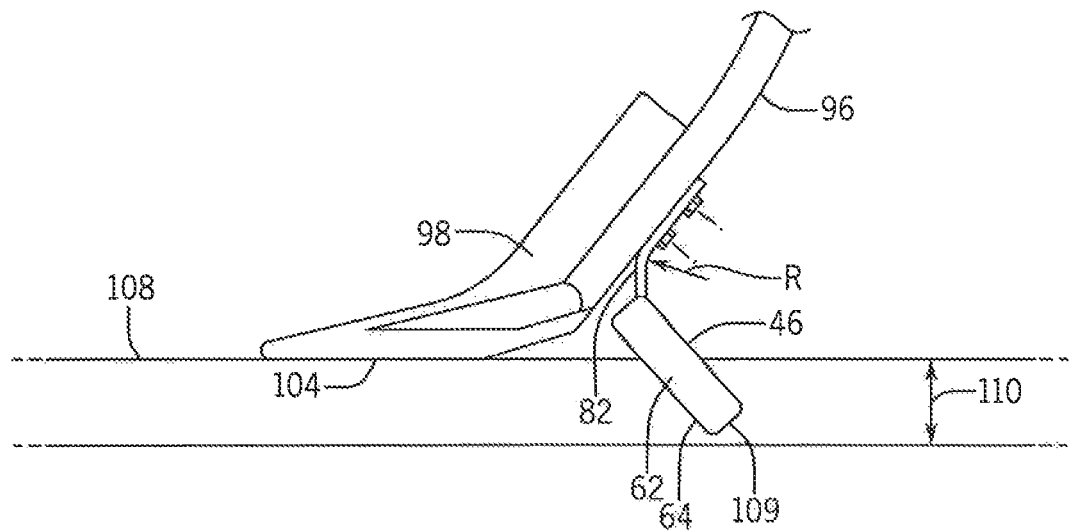
FIGS. 9 and 10 illustrate steps in calibrating a seedbed floor sensing element of the real-time tilled surface uniformity determination apparatus, in accordance with an exemplary embodiment of the present invention.

FIG. 9, shows the seedbed floor sensing element 46 attached behind the sweep 94 with the sweep 94 raised out of contact with the ground surface. In this state, the flexible section 82 of the sensor body 62 allows the sensor body 62 to articulate and pivotably drop downward, in the manner shown in FIG. 9. In this position, the lowest point of the soil-contacting surface 64 of the sensing element 46 is extended to a sensor-zeroing position 109 below the reference plane 108 and the bottom surface 104 of the sweep 94.

In this position, curvature R of the flexible section 82 of the sensor body is relaxed to its largest possible radius, and the signal F generated by the strain gauge 68 is essentially zero. Since the sensor-zeroing position 109 is a function of geometry, the distance 110 is known, or can be inputted to the signal processing unit 50 via the touchscreen 51, to provide a vertical position relative to the reference plane 108 matching a zero value of the signal F generated by the strain gauge 68.

Figure 10:
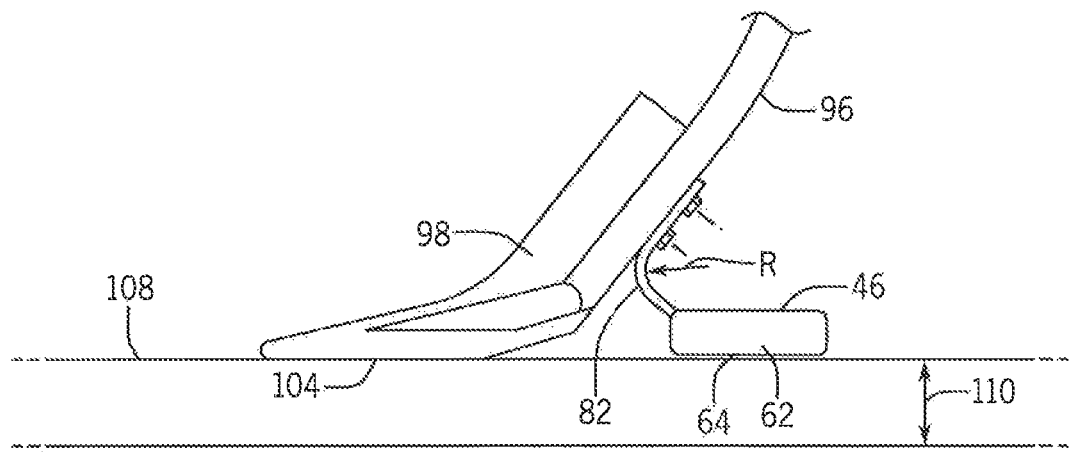

As shown in FIG. 10, the sweep 94 is then lowered to rest on a flat surface such that the reference plane 108 extends essentially co-planar with the flat surface. As the sweep 94 is lowered, the soil-contacting surface 64 of the sensing element 46 comes into contact with the flat surface, and the flexible section 82 of the sensor body 62 is bent into a tight radius R as the sweep 94 comes to rest on the flat surface. With both the sweep 94 and the soil-contacting surface 64 of the sensing element 46 in full contact with the flat surface in this sensor calibrating position, the signal processing unit 50 records a calibration value of the signal F generated by the strain gauge 68 with the soil-contacting surface 64 located at the calibration position. Because the distance between the sensor-zeroing position and the reference plane 108 are known, the signal processing unit 50 can now determine the vertical position of the soil-contacting surface 64 with respect to the reference plane 108 using known operating characteristics of the strain gauge 68 and the present signal F being generated by the strain gauge 68.

In some embodiments of the invention, the processor 90 of the signal processing unit 50 may be configured to retrieve vertical distance values matching given present signals F of the strain gauge 68 from a table of values stored in the data storage device 70 of the signal processing unit 50. In other embodiments, the processor 90 of the signal processing unit 50 may be configured to calculate the present vertical displacement of the soil-contacting surface 64 from the reference position or plane 108 as a function of the present value of the signal F using a calculation process stored in the data storage device or pre-programmed into the processor 90.

As shown in FIGS. 11 and 12, as the shank 92 pivots about the pivot bolt 98 (see FIG. 5), or when the sweep 94 floats up for whatever reason, the sharpness of curvature R of the flexible section 82 of the sensor body 62 is reduced, thereby causing a corresponding reduction in the value of the strain on the flexible section 82 and in the value of signal F generated by the strain gauge 68. This reduced value of the signal F is used by the signal processing unit 50 to calculate a new present vertical position of the soil contacting surface 64 of the sensing element 46 with respect to the reference surface or plane 108.

The signal processing unit 50 is configured to determine the present uniformity of the seedbed floor surface 41 and generate real-time surface information signals I(F) corresponding to the detected and determined present uniformity using tabulated data stored in the data storage device 70, or from a surface uniformity calculation process stored in the data storage device 70 or programmed into the processor 90.

Calibration and operation of the seedbed surface sensing elements 48 of the exemplary embodiment of the invention are carried out in similar fashion to the preceding description of calibration and operation of the seedbed floor sensing elements 46.

Figure 13:
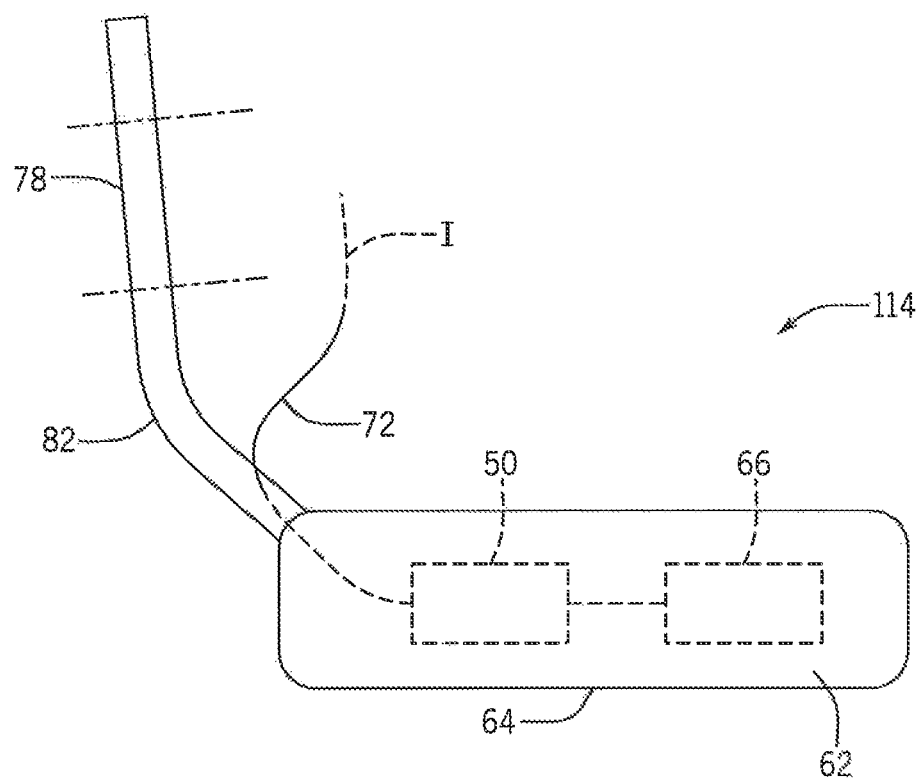
FIG. 13 illustrates an alternate embodiment of a sensing element of the invention that includes both a vertical position sensor and a signal processing unit in a body of the sensing element, in accordance with an exemplary embodiment of the present invention.

FIG. 13 shows an alternate embodiment of a sensing element 114 in which the vertical position sensor 66 and the signal processing unit 50 are both incorporated into the sensor body 62. In such an embodiment, the sensing element 114 provides a seedbed uniformity information signal I, in a form that is compatible for direct connection to a display or control element. In some embodiments, the seedbed uniformity information signal may be provided in a format that is readable on an IOBUS-VT compatible display.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but it is intended to include all changes and modifications that are within the scope and spirit of the invention.

What is claimed is:

1. An apparatus for real-time determination of uniformity of a tilled surface of a seedbed as the tilled surface is formed by a tillage tool of an agricultural tillage implement travelling in a tillage direction over a ground surface with the tillage tool operatively engaging the ground surface, the apparatus comprising a seedbed uniformity sensing arrangement including:
    a sensing element having a sensor body attached to the implement behind the tillage tool such that the sensor body is vertically articulable relative to the tillage tool, the sensor body defining a soil-contact surface configured to bear downward against the tilled surface; and
    the sensing element also having a vertical position sensor fixedly attached to the sensor body, the vertical position sensor generating an electrical surface uniformity signal indicative of vertical movement of the soil-contact surface as the soil-contact surface rides along on the tilled surface behind the tillage tool as the tilled surface is formed by the tillage tool.

2. The apparatus of claim 1, further comprising a signal processing unit operatively connected in electrical communication with the vertical position sensor, the signal processing unit being configured for determining a surface uniformity of the tilled surface of the seedbed based at least in part on the electrical surface uniformity signal.

3. The apparatus of claim 2, wherein the signal processing unit is disposed within the sensor body.

4. The apparatus of claim 2, wherein the vertical position sensor is a strain gauge fixedly attached to the sensor body, the strain gauge generating the electrical surface uniformity signal in response to bending loads imposed on the sensor body by vertical movement of the soil-contact surface as the soil-contact surface rides along on the tilled surface.

5. The apparatus of claim 4, wherein:
    the sensor body defines substantially perpendicularly extending longitudinal and vertical axes of the sensor body, front and rear ends of the sensor body, a vertically flexible section of the sensor body disposed between the front and rear ends of the sensor body, and forward of the soil-contact surface of the sensor body;
    the front end of the sensor body further defining a mounting arrangement adapted for operative attachment to the implement in a manner that positions the sensor body behind the tillage tool in operative contact with the tilled surface behind the tillage tool;
    the strain gauge is operatively and fixedly attached to the flexible section of the body and configured for detecting a bending load on the flexible section imposed by vertically directed force generated by contact between the soil-contacting surface of the sensor body and the tilled surface behind the tillage tool, the electrical surface uniformity signal being an electrical strain signal that is indicative of the bending load being imposed on the flexible section of the sensor body by present contact between the tilled surface and the soil-contacting surface of the sensor body; and
    the signal processing unit is configured for converting the electrical strain signal into the electrical surface uniformity signal.

6. The apparatus of claim 2, further comprising a controller communicatively coupled to the signal processing unit, the controller being configured for controlling an operation of the implement to adjust at least one operating parameter of the implement based at least in part on the surface uniformity of the tilled surface.

7. The apparatus of claim 1, wherein:
    the tillage tool is one of multiple tillage tools of the implement operatively disposed with relation to one another for producing a seedbed swath having a substantially continuous tilled surface;
    the sensing element is one of multiple sensing elements arranged in sensing array for contacting the substantially continuous tilled surface at various points within the seedbed swath; and
    the seedbed uniformity sensing arrangement further comprises a signal processing unit operatively connected to the multiple sensing elements, the signal processing unit being configured for determining a composite surface uniformity across the continuous tilled surface of the seedbed swath based at least in part on the electrical surface uniformity signals generated by the multiple sensing elements.

8. The apparatus of claim 1, wherein:
    the tillage tool includes a flexible shank having a distal end adapted for receiving
    a sub-surface tool, the sub-surface tool defining a bottom surface configured for creating the tilled surface, the tilled surface being seedbed floor; and
    the sensor body of the sensing element is attached to the shank behind the sub-surface tool with the soil-contacting surface of the sensor body disposed along a reference plane that is vertically aligned with the bottom surface of the sub-surface tool.

9. The apparatus of claim 1, wherein:
    the tillage tool is a surface finishing tool operatively disposed at a rear end of the agricultural tillage implement, the surface finishing tool defining a bottom surface configured for forming the tilled surface, the tilled surface being a top surface of the seedbed; and
    the sensor body of the sensing element is attached to the surface finishing tool behind the surface finishing tool with the soil-contacting surface of the sensor body disposed along a reference plane that is vertically spaced from the bottom surface of the surface finishing tool.

10. An agricultural tillage implement, comprising:
    an implement frame supported above a ground surface by implement support wheels operatively connected to the implement frame by a depth control arrangement, the frame defining a longitudinal axis of the implement extending from a front end to a rear end of the implement, the implement being configured for operation in a tillage direction extending substantially parallel to the longitudinal axis;
    a soil engaging tillage tool attached to the implement frame and configured for creating a tilled surface for a seedbed behind the tillage tool as the implement moves in the tillage direction; and a seedbed uniformity sensing arrangement including:
- a sensing element having a sensor body attached to the implement behind the tillage tool such that the sensor body is vertically articulable relative to the tillage tool, the sensor body defining a soil-contact surface configured to bear downward against the tilled surface; and
- the sensing element also having a vertical position sensor fixedly attached to the sensor body, the vertical position sensor generating an electrical surface uniformity signal indicative of vertical movement of the soil-contact surface as the soil-contact surface rides along on the tilled surface behind the tillage tool as the tilled surface is formed by the tillage tool.

11. The agricultural tillage implement of claim 10, further comprising a signal processing unit operatively connected in electrical communication with the vertical position sensor, the signal processing unit being configured for determining a surface uniformity of the tilled surface of the seedbed based at least in part on the electrical surface uniformity signal.

12. The agricultural tillage implement of claim 11, wherein the signal processing unit is disposed within the sensor body.

13. The agricultural tillage implement of claim 11, wherein the vertical position sensor is a strain gauge fixedly attached to the sensor body, the strain gauge generating the electrical surface uniformity signal in response to bending loads imposed on the sensor body by vertical movement of the soil-contact surface as the soil-contact surface rides along on the tilled surface.

14. The agricultural tillage implement of claim 13, wherein:
- the sensor body defines substantially perpendicularly extending longitudinal and vertical axes of the sensor body, front and rear ends of the sensor body, a vertically flexible section of the sensor body disposed between the front and rear ends of the sensor body, and forward of the soil-contact surface of the sensor body;
- the front end of the sensor body further defining a mounting arrangement adapted for operative attachment to the implement in a manner that positions the sensor body behind the tillage tool in operative contact with the tilled surface behind the tillage tool;
- the strain gauge is operatively and fixedly attached to the flexible section of the body and configured for detecting a bending load on the flexible section imposed by vertically directed force generated by contact between the soil-contacting surface of the sensor body and the tilled surface behind the tillage tool, the electrical surface uniformity signal being an electrical strain signal that is indicative of the bending load being imposed on the flexible section of the sensor body by present contact between the tilled surface and the soil-contacting surface of the sensor body; and
- the signal processing unit is configured for converting the electrical strain signal into the electrical surface uniformity signal.

15. The agricultural tillage implement of claim 11, further comprising a controller communicatively coupled to the signal processing unit, the controller being configured for controlling an operation of the implement to adjust at least one operating parameter of the implement based at least in part on the surface uniformity of the tilled surface.

16. The agricultural tillage implement of claim 11, wherein:
- the tillage tool is one of multiple tillage tools of the implement operatively disposed with relation to one another for producing a seedbed swath having a substantially continuous tilled surface;
- the sensing element is one of multiple sensing elements arranged in sensing array for contacting the substantially continuous tilled surface at various points within the seedbed swath; and
- the seedbed uniformity sensing arrangement further comprises a signal processing unit operatively connected to the multiple sensing elements, the signal processing unit being configured for determining a composite surface uniformity across the continuous tilled surface of the seedbed swath based at least in part on the electrical surface uniformity signals generated by the multiple sensing elements.

17. The agricultural tillage implement of claim 10, wherein:
- the tillage tool includes a flexible shank having a distal end adapted for receiving
- a sub-surface tool, the sub-surface tool defining a bottom surface configured for creating the tilled surface, the tilled surface being a seedbed floor; and
- the sensor body of the sensing element is attached to the shank behind the sub-surface tool with the soil-contacting surface of the sensor body disposed along a reference plane that is vertically aligned with the bottom surface of the sub-surface tool.

18. The agricultural tillage implement of claim 10, wherein:
- the tillage tool is a surface finishing tool operatively disposed at a rear end of the agricultural tillage implement, the surface finishing tool defining a bottom surface configured for forming the tilled surface, the tilled surface being a top surface of the seedbed; and
- the sensor body of the sensing element is attached to the surface finishing tool behind the surface finishing tool with the soil-contacting surface of the sensor body disposed along a reference plane that is vertically spaced from the bottom surface of the surface finishing tool.

19. A method for determining in real-time a uniformity of a tilled surface of a seedbed as the tilled surface is formed by a tillage tool of an agricultural tillage implement travelling in a tillage direction over a ground surface with the tillage tool operatively engaging the ground surface, the method comprising:
- receiving data indicative of vertical movement of a sensor body from a vertical position sensor fixedly attached to the sensor body, the sensor body being attached to the implement behind the tillage tool such that the sensor body is vertically articulable relative to the tillage tool, the sensor body defining a soil-contact surface configured to bear downward against the tilled surface, the data indicative of the vertical movement of the sensor body including an electrical surface uniformity signal generated by the vertical position sensor in response to vertical movement of the soil-contact surface as the soil-contact surface rides along on the tilled surface behind the tillage tool as the tilled surface is formed by the tillage tool;
- determining surface uniformity of the tilled surface of the seedbed from the electrical surface uniformity signal; and
- controlling an operation of the agricultural tillage implement based at least in part on the surface uniformity of the tilled surface of the seedbed.

20. The method of claim 19, further including generating an operating parameter control signal based at least in part on the electrical surface uniformity signal, wherein controlling the operation of the agricultural tillage implement comprises controlling the operation of the agricultural tillage implement based on the operating parameter control signal to adjust at least one operating parameter of the agricultural tillage implement.

21. The method of claim 19, wherein controlling the operation of the agricultural tillage implement comprises controlling a user interface to indicate the surface uniformity of the tilled surface of the seedbed.

\* \* \* \* \*